(12) United States Patent  
Ide et al.

(10) Patent No.: US 8,929,105 B2  
(45) Date of Patent: Jan. 6, 2015

(54) POWER SOURCE CIRCUIT

(75) Inventors: Takeshi Ide, Fujisawa (JP); Daishiro Sekijima, Higashikurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 13/810,628

(22) PCT Filed: Jul. 15, 2011

(86) PCT No.: PCT/JP2011/067012  
§ 371 (c)(1),  
(2), (4) Date: Jan. 16, 2013

(87) PCT Pub. No.: WO2012/011602  
PCT Pub. Date: Jan. 26, 2012

(65) Prior Publication Data  
US 2013/0114305 A1    May 9, 2013

(30) Foreign Application Priority Data  
Jul. 21, 2010    (JP) ................................ 2010-164000

(51) Int. Cl.  
*H02M 1/12*    (2006.01)  
*H02M 1/44*    (2007.01)

(52) U.S. Cl.  
USPC .............................. 363/39; 363/47

(58) Field of Classification Search  
USPC .............................. 363/39, 44–48  
See application file for complete search history.

(56) References Cited

U.S. PATENT DOCUMENTS

| | | | | |
|---|---|---|---|---|
| 4,999,594 A | * | 3/1991 | Ingman | .......................... 333/181 |
| 5,148,360 A | * | 9/1992 | Nguyen | ............................ 363/48 |
| 5,237,492 A | * | 8/1993 | King | ................................ 363/46 |
| 5,757,628 A | | 5/1998 | Kamata | |
| 2007/0247132 A1 | | 10/2007 | Iwamoto | |
| 2013/0301319 A1 | * | 11/2013 | Ide et al. | .......................... 363/52 |

FOREIGN PATENT DOCUMENTS

| | | |
|---|---|---|
| CN | 1407702 A | 4/2003 |
| CN | 1757159 A | 4/2006 |
| JP | H02-079766 A | 3/1990 |
| JP | H03-040892 U | 4/1991 |
| JP | H11-055943 A | 2/1999 |
| JP | 2008-182784 A | 8/2007 |
| JP | 2008-079386 A | 4/2008 |
| JP | 2010-288381 A | 12/2010 |

OTHER PUBLICATIONS

Shoyama et al.; Mechanism of Common-Mode Noise Reduction in Balanced Boost Switching Converter; 2004 35th IEEE Power Electronics Specialists Conference; Aachen, Germany, 2004; pp. 1115-1120.

* cited by examiner

*Primary Examiner* — Jessica Han  
(74) *Attorney, Agent, or Firm* — Canon USA, Inc. IP Division (57) ABSTRACT

In a power source circuit including a switching circuit 8 as a power conversion circuit for converting by a switching operation at least one of a frequency and a voltage of an alternating voltage from an alternating power source 2 via a pair of supply lines 3 and 4, one supply line 3 includes a fuse 5 as an excess current protection element, and between a ground line 10 and one supply line 3, a first line bypass capacitor 6 is connected. Between the ground line 10 and another supply line 4, a second line bypass capacitor 7 is connected, and another supply line 4 includes an inductor 9. With this configuration, an unbalanced state of the circuit due to the excess current protection element is reduced so as to restrain the common mode noise.

4 Claims, 13 Drawing Sheets

POWER SOURCE CIRCUIT

TECHNICAL FIELD

The present invention relates to a power source circuit that restrains a high frequency noise generated by a switching operation.

BACKGROUND ART

A conventional electronic device includes a power conversion circuit to convert a frequency or a voltage of an arbitrary input power source into frequencies or voltages for various devices in the electronic device. Particularly, a switching method is widely used to make the power conversion circuit compact and efficient. However, in the power source circuit adopting the switching method, a switching noise having a high frequency is generated by the switching operation, thereby causing a terminal noise or an electromagnetic wave noise.

Figure 9:
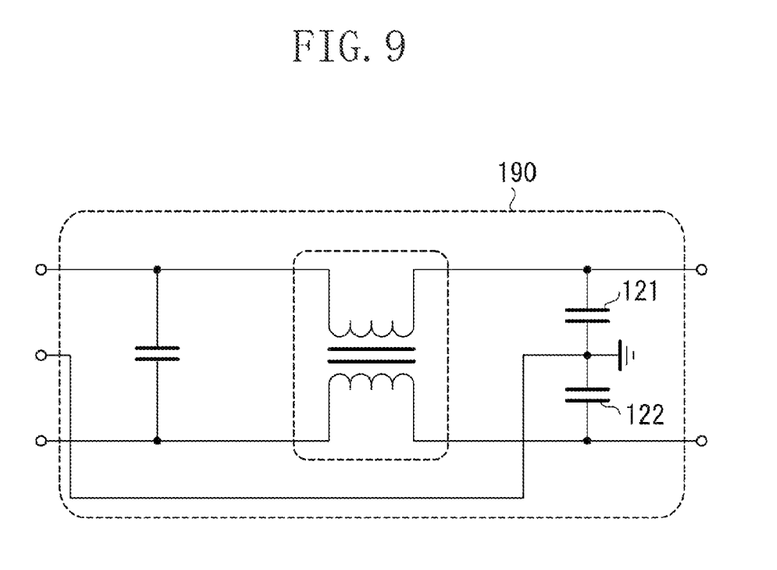
FIG. 9 is an electric circuit diagram illustrating a filter circuit of a conventional power source circuit.

As a noise filter for reducing such an electromagnetic noise, Japanese Patent Application Laid-Open No. 2008-182784 discusses a line bypass capacitor (hereinafter, referred to as a "Y capacitor"). FIG. 9 is an example of a filter circuit diagram used for a conventional switching power source circuit.

A filter circuit 190 illustrated in FIG. 9 includes Y capacitors 121 and 122 connected between each supply line of a pair of supply lines and a ground (hereinafter, referred to as a "GND)". The Y capacitors 121 and 122 function to discard to the GND a common mode component of the high frequency switching noise generated from a switching element to restrain the terminal noise or the electromagnetic noise.

Impedance of the two supply lines connected from an input power source to the GND is generally set to be equal so that the two supply lines are balanced with respect to the GND. For example, in a filter circuit 190 illustrated in FIG. 9, the two Y capacitors 121 and 122 keep balanced by having capacity values thereof as a same value.

CITATION LIST

Patent Literature

PTL 1 Japanese Patent Application Laid-Open No. 2008-182784

SUMMARY OF INVENTION

Technical Problem

However, to prevent a circuit element from troubles, the switching power source includes an excess current protection element (e.g., fuse) at an input side of the Y capacitor of one supply line of the two supply lines connected from the input power source. This excess current protection element has larger inductance compared to that of a circuit wiring.

If the switching power source is further made compact and efficient, the switching frequency becomes higher, and thus the impedance caused by the inductance of the excess current protection element becomes larger, thereby increasing an unbalanced level between the two supply lines. If the two supply lines are in an unbalanced state, a normal mode component of a high frequency noise flowing through the two supply lines is converted into a common mode component to increase the common mode noise.

Solution to Problem

A purpose of the present invention is to reduce an unbalanced state of a circuit caused by an excess current protection element and provide a power source circuit that restrains the common mode noise.

According to the present invention, a power source circuit includes: a power conversion circuit configured to convert by a switching operation at least one of a frequency and a voltage of an alternating voltage from an alternating power source via a pair of supply lines; an excess current protection element provided for one supply line of the pair of supply lines; a first line bypass capacitor connected between the ground and the one supply line; a second line bypass capacitor connected between the ground and, of the pair of supply lines, another supply line; and an inductor provided for the another supply line, wherein, when a capacity value of the first line bypass capacitor is defined as $C1[F]$, a capacity value of the second line bypass capacitor is defined as $C2[F]$, an inductance value of the one supply line including an inductance component of the excess current protection element is defined as $L1[H]$, an inductance value of the another supply line including an inductance component of the inductor is defined as $L2[H]$, and an angular frequency of noise is defined as $\omega$ [rad/s], the inductance value of the inductor is set to satisfy a following expression.

$$\frac{2C_1 - C_2 - 2\omega^2 L_1 C_1 (C_1 + C_2)}{3C_2(1 - \omega^2 L_1 (C_1 + C_2))} L_1 <$$
$$L_2 < \frac{2C_1 - C_2 - 2\omega^2 L_1 C_1 (C_1 + C_2)}{C_2(1 - \omega^2 L_1 (C_1 + C_2))} L_1$$

According to the present invention, a power source circuit includes: a power conversion circuit configured to convert by a switching operation at least one of a frequency and a voltage of an alternating voltage from an alternating power source via a pair of supply lines; an excess current protection element provided for one supply line of the pair of supply lines; a first choke coil provided for the one supply line; a second choke coil provided for another supply line of the pair of supply lines; a first line bypass capacitor connected between the ground and the one supply line; and a second line bypass capacitor connected between the ground and another supply line, wherein, when an inductance value of the one supply line including an inductance component of the first choke coil and the excess current protection element is defined as $L1[H]$, an inductance value of the another supply line including an inductance component of the second choke coil is defined as $L2[H]$, a capacity value of the first line bypass capacitor is defined as $C1[F]$, a capacity value of the second line bypass capacitor is defined as $C2[F]$, the capacity values of the first line bypass capacitor and the second line bypass capacitor are set to satisfy a following expression.

$$\frac{2L_2}{L_1} - 1 < \frac{C_1}{C_2} < 1$$

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B illustrate schematic configurations of a power source circuit according to a first exemplary embodiment of the present invention.

FIGS. 3A and 3B each illustrate current spectrum of a power source circuit flowing into GND according to the first exemplary embodiment of the present invention.

FIGS. 5A and 5B illustrate schematic configurations of a power source circuit according to a second exemplary embodiment of the present invention.

FIGS. 7A and 7B each illustrate current spectrum in a power source circuit flowing to GND according to the second exemplary embodiment of the present invention.

DESCRIPTION OF EMBODIMENTS

Various exemplary embodiments, features, and aspects of the invention will be described in detail below with reference to the drawings.

EXAMPLE 1

Figure 1A:
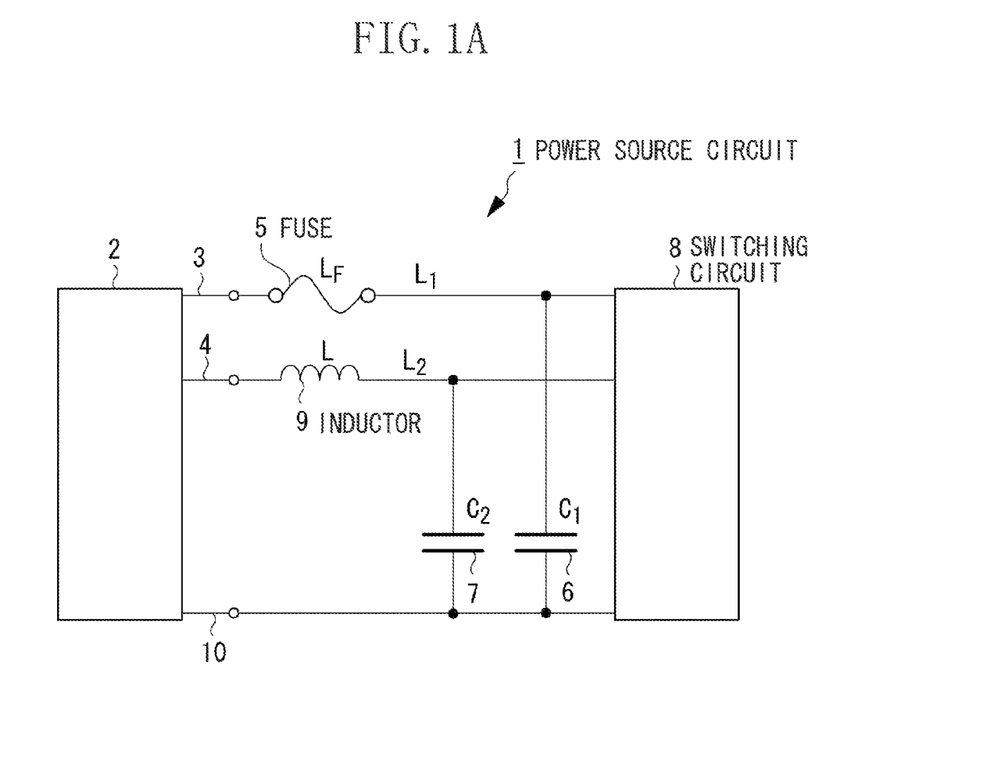
FIG. 1A is a schematic electric circuit diagram illustrating a power source circuit.

FIG. 1 illustrates a schematic configuration of a power source circuit according to a first exemplary embodiment of the present invention. FIG. 1A is a schematic electric circuit diagram of the power source circuit. In FIG. 1A, a power source circuit 1 includes a pair of supply lines 3 and 4 connected to an alternating power source 2, a switching circuit 8 as a power conversion circuit for converting the alternating voltage from the alternating power source 2 into a direct current voltage via the pair of supply lines 3 and 4. The alternating power source 2 is, for example, a power source for commercial use.

Further, the power source circuit 1 includes a fuse 5 as an excess current protection element provided for, of the pair of supply lines 3 and 4, one supply line 3 that is a positive voltage. This fuse 5 is, for example, a tube fuse. The fuse 5 has a higher inductance value than that of a wiring constituting the supply lines 3 and 4.

Furthermore, the power source circuit 1 includes a first line bypass capacitor 6 (hereinafter, referred to as a "first Y capacitor") connected between a ground (GND) 10 and a supply line 3 of the positive voltage. Moreover, the power source circuit 1 includes a second line bypass capacitor 7 (hereinafter, referred to as a "second Y capacitor") connected between the GND 10 and, of the pair of supply lines 3 and 4, another supply line 4 having a negative voltage.

According to the first exemplary embodiment, the power source circuit 1 includes an inductor 9, which is an inductive element provided for the supply line 4 having the negative voltage.

Figure 1B:
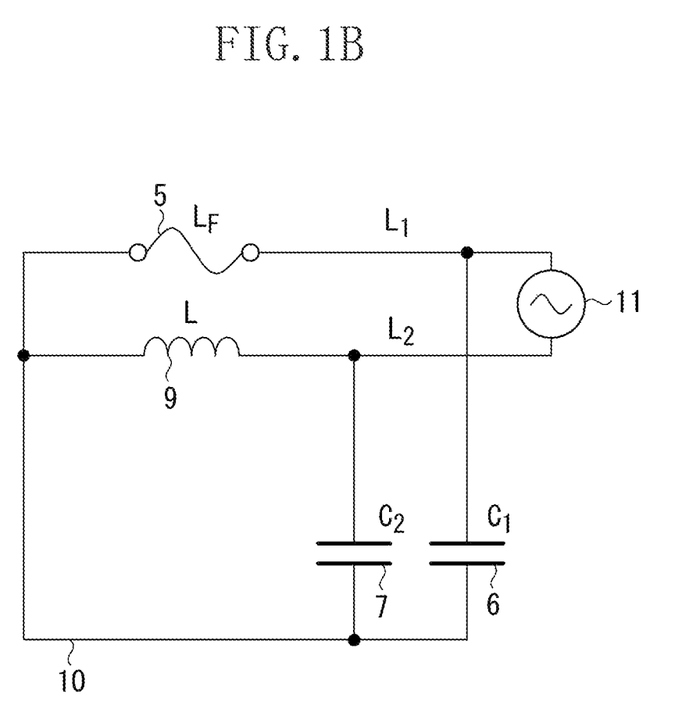
FIG. 1B is an electric circuit diagram in which a power source circuit illustrated in FIG. 1A is replaced with a bridge circuit.

FIG. 1B is an electric circuit diagram in which the power source circuit 1 illustrated in FIG. 1A is replaced with a bridge circuit. In FIG. 1B, in place of the switching circuit 8 that is a power conversion circuit, a noise voltage source 11 is connected thereto to simulate the noise generated in the switching circuit 8.

As described above, the power source circuit 1 can be regarded as a bridge circuit of the fuse 5, the Y capacitors 6 and 7, and the inductor 9 when the switching circuit 8 is simulated by the noise voltage source 11. In FIG. 1B, the noise causing terminal noise or electromagnetic wave noise is a current flowing to the GND 10.

Herein, an inductance value of the supply line 3 of the positive voltage including an inductance component (inductance value LF) of the fuse 5 is defined as L1 [H]. Further, a capacity value of the first Y capacitor 6 connected to the supply line 3 of the positive voltage is defined as C1 [F], and a capacity value of the second Y capacitor 7 connected to the supply line 4 having the negative voltage is defined as C2 [F].

Further, an inductance value of the supply line 4 having the negative voltage and including an inductance component (inductance value "L") of the inductor 9 is defined as L2[H], the voltage of the noise of the noise voltage source 11 is defined as "V"[V], and an angular frequency of the noise is defined as "ω" [rad/s]. A current "I" [A] flowing to the GND 10 can be expressed as the following equation (1).

$$I = \left| \frac{\omega^2(L_1C_1 - L_2C_2)}{j\omega(L_1 + L_2) - j\omega^3 L_1 L_2 (C_1 + C_2)} \right| V \quad (1)$$

By the equation (1), an expression for reducing the current flowing to the GND 10 can be expressed as the following equation (2).

$$L_1C_1 - L_2C_2 = 0 \quad (2)$$

Thus, to the inductance value L1 of the supply line 3 of the positive voltage where the fuse 5 is provided, when the values of C1, C2, and L2 are set to satisfy the following equation (3), $$\frac{C_1}{C_2} = \frac{L_2}{L_1} \quad (3)$$

the common mode noise can be restrained most.

Figure 2:
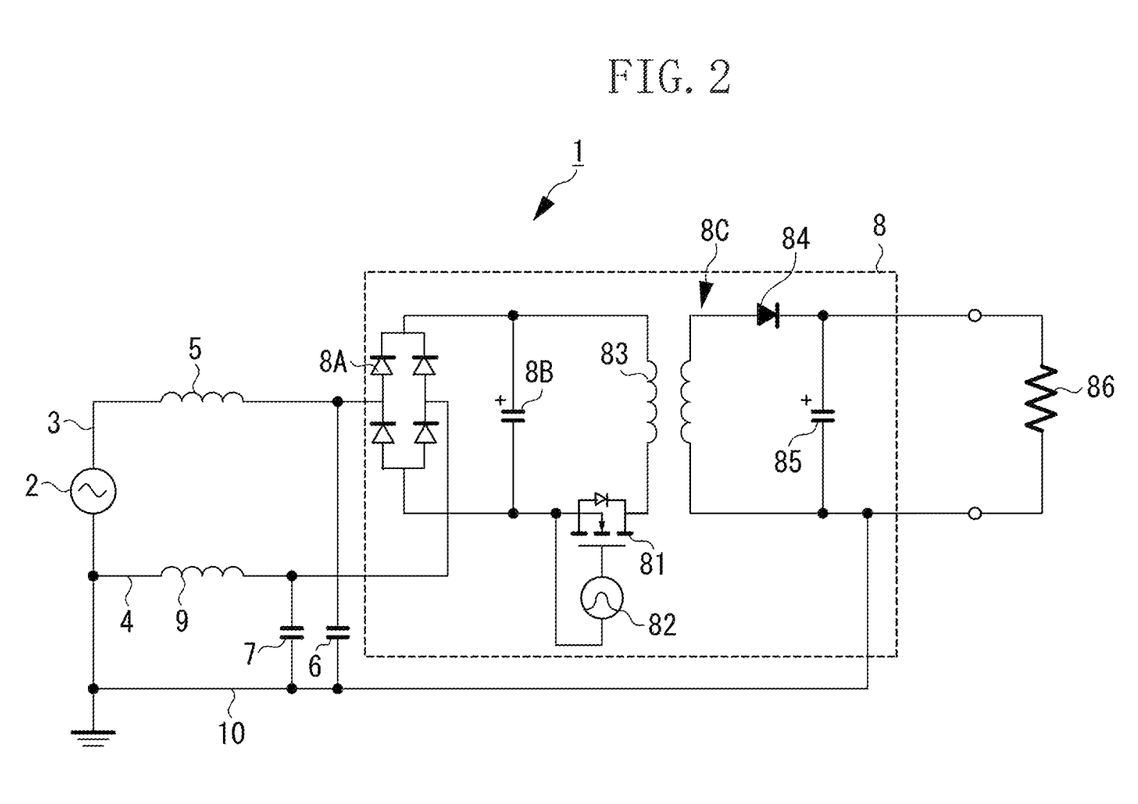
FIG. 2 is an electric circuit diagram illustrating a configuration of the power source circuit according to the first exemplary embodiment of the present invention.

Next, a reduction effect of the common mode noise in the power source circuit having a specific configuration will be described. FIG. 2 is an electric circuit diagram illustrating a configuration of the power source circuit. Any method for a switching operation can be adopted for the switching circuit 8. As an example, a flyback method will be described.

The switching circuit 8 illustrated in FIG. 2 includes a rectifying circuit 8A including bridge diodes, a smoothing capacitor 8B, and a DC-DC converter circuit 8C. The rectifying circuit 8A converts the alternating voltage into the direct current voltage. The smoothing capacitor 8B smoothes the direct current voltage converted by the rectifying circuit 8A.

The DC-DC converter circuit 8C includes a switching element 81, a switching control circuit 82, a transformer 83, a diode 84, and a capacitor 85. The switching element 81 includes, for example, a bipolar transistor or a field effect transistor (FET) and is turned on/off by a pulse signal output from the switching control circuit 82.

When the switching element 81 is on, energy is stored in the transformer 83. When the switching element 81 is off, the energy is supplied to a load 86 via the diode 84. When the switching element 81 is on, the power is discharged from the capacitor 85 and the energy is supplied to the load 86. With this operation, a direct current voltage of a predetermined value is applied to the load 86.

In the power source circuit 1 of the flyback method, using a circuit simulation, an amount of a noise current is calculated. The alternating voltage of 50 [Hz], 100[V] is input from the alternating power source 2, and the switching signal of a rectangular wave having a frequency 53 [kHz], a rising time 40 [ns], and a duty ratio 25 [%] is input to the switching element 81.

Figure 3A:
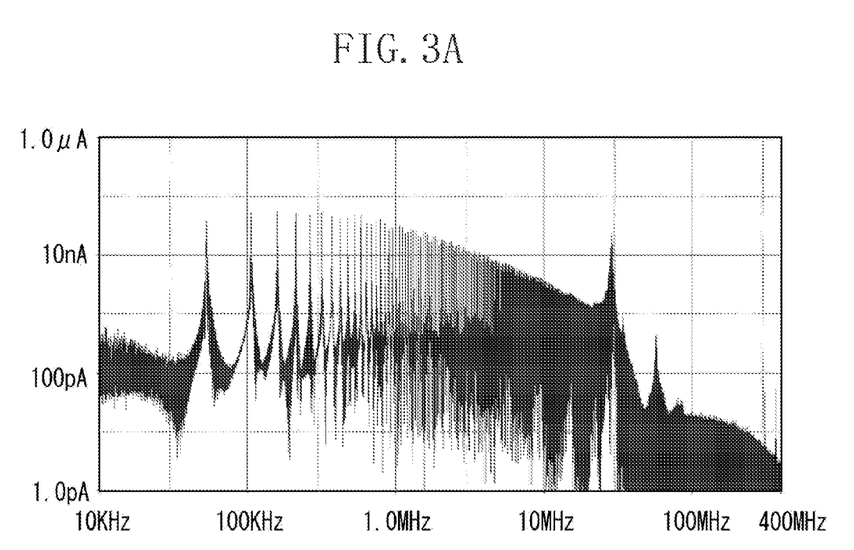
FIG. 3A illustrates an unbalanced state in which an inductor is not inserted.
Figure 3B:
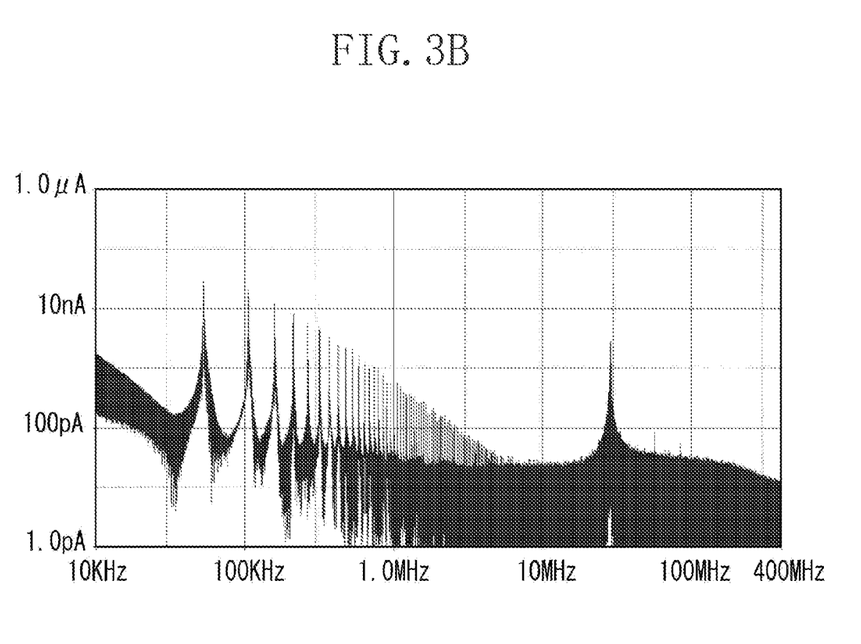
FIG. 3B illustrates a balanced state in which an inductor is inserted.

FIGS. 3A and 3B each illustrate a result of a current spectrum flowing to the GND 10. Each inductance value of the wirings itself of the supply lines 3 and 4 is assumed to "0". FIG. 3A illustrates an unbalanced state in which each capacity value of the Y capacitors 6 and 7 connected to the supply lines 3 and 4 having the positive voltage and the negative voltage respectively is set to 1000 [pF], the inductance value LF (=L1) of the fuse 5 is set to 20 [nH], and the inductor 9 is not inserted in the power source circuit 1.

FIG. 3B illustrates a balanced state in which the inductor 9 is added and the values of the Y capacitors 6 and 7 are adjusted. At this point, the capacity value C1 of the Y capacitor 6 is set to 1500 [pF], and the capacity value C2 of the Y capacitor 7 is set to 1000 [pF]. Further, to satisfy the equation (3), the inductance value "L" (=L2) of the added inductor 9 is set to 30[nH]. The values of Y capacitors 6 and 7 are adjusted so that the inductance value "L" of the inductor 9 can be set.

From the results illustrated in FIGS. 3A and 3B, it can be known that, since the value of the inserted inductor 9 is set to satisfy the equation (3), the spectra of the currents of the common mode noise generated due to the unbalanced state of the fuse 5 are reduced. In the description above, the inductance value of the wiring is assumed to "0", however, the inductance values L1 and L2 may include the inductance value of the wiring.

Next, the noise current amount in the power source circuit 1 illustrated in FIG. 1B is calculated using the circuit simulation. A Gaussian pulse of 1[V] is input from the noise voltage source 11. Each capacity amount of the Y capacitors 6 and 7 connected to the positive electrode and the negative electrode respectively is set to C1=C2=1000 [pF], the inductance value of the fuse 5 is set to L1=20 [nH], the inductance value L2 of the inductor 9 is used as a parameter.

Figure 4:
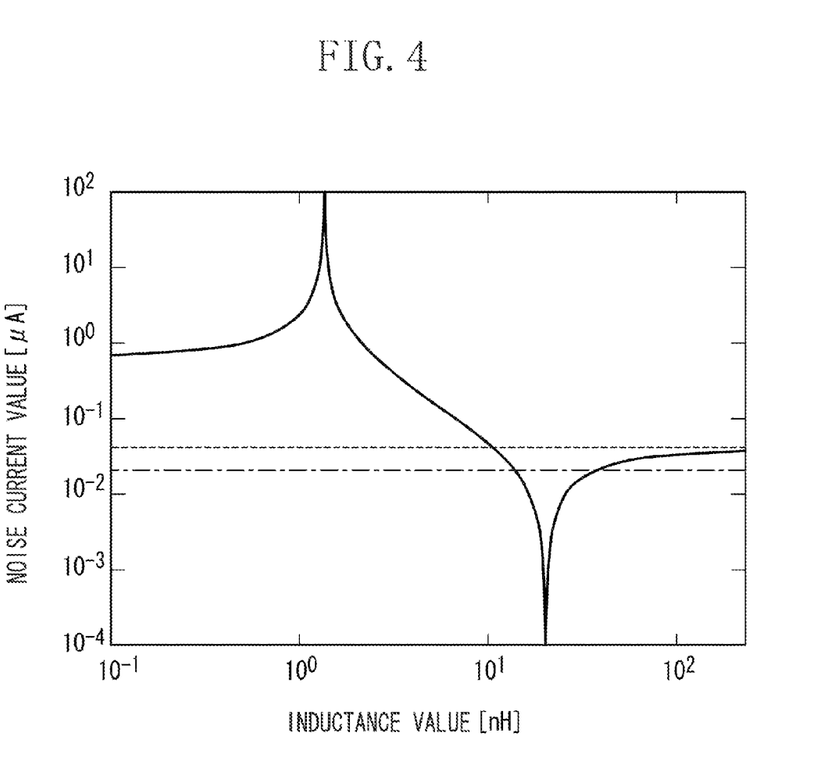
FIG. 4 illustrates a relationship between an inductance value of an inductor and a current amount of noise in a power source circuit according to the first exemplary embodiment of the present invention.

In the state described above, FIG. 4 illustrates a graph indicating with a solid line the inductance value L2 of the inductor 9 on a horizontal axis, and an absolute value of the noise current of 100 [MHz] flowing to the GND 10 calculated from the equation (1) on a vertical axis. FIG. 4 illustrates that, when the inductance value L2 indicates 20 [nH] acquired by using the equation (3), the noise current amount becomes minimum.

If the inductance value L2 (>>L1) is set larger than 20 [nH], from the equation (1), the value of the current amount converges as acquired by the equation (4).

$$I = \frac{\omega C_2}{1 - \omega^2 L_1 (C_1 + C_2)} V \quad (4)$$

In FIG. 4, a straight line illustrated with a dotted line is an asymptotic line. From a definition of a half band width, L2 when the current value becomes half a value acquired by the equation (4) is acquired by the equation (5).

$$L_2 = \frac{2C_1 - C_2 - 2\omega^2 L_1 C_1 (C_1 + C_2)}{3C_2 (1 - \omega^2 L_1 (C_1 + C_2))} L_1, \quad (5)$$

$$\frac{2C_1 - C_2 - 2\omega^2 L_1 C_1 (C_1 + C_2)}{C_2 (1 - \omega^2 L_1 (C_1 + C_2))} L_1$$

In FIG. 4, a straight line illustrated with a dashed line indicates a value that is a half value as calculated by using the equation (5). Therefore, an area of the inductance value L2 between two crossing points where the solid line indicating the inductance value L2 and the dashed line cross each other, is acquired by the equation (6).

$$\frac{2C_1 - C_2 - 2\omega^2 L_1 C_1 (C_1 + C_2)}{3C_2 (1 - \omega^2 L_1 (C_1 + C_2))} L_1 < \quad (6)$$

$$L_2 < \frac{2C_1 - C_2 - 2\omega^2 L_1 C_1 (C_1 + C_2)}{C_2 (1 - \omega^2 L_1 (C_1 + C_2))} L_1$$

As described above, if the inductance value "L" (when the inductance of the wiring itself of the supply line 4 can be ignored, L2=L) of the inductor 9 is set so that the inductance value L2 satisfies the equation (6), the reduction of the common mode noise can be expected.

As described above, if the inductance value "L" of the inductor 9 is set so that the equation (6) is satisfied, the unbalanced state between the pair of the supply lines 3 and 4 due to the fuse 5 can be improved to reduce the common mode noise generated by the unbalanced state. If an example of the above-described numeral values of elements (when the inductance of the supply lines 3 and 4 is set to "0") is substituted, 13.8 [nH]<L2<41.4 [nH] can be acquired.

The spectrum of the noise is measured by an experiment in advance, and the frequency of the noise (i.e., angular frequency of the noise "ω") may be set to one peak value acquired by the measurement. If the inductance value L2 is set so that the value is within the area of the equation (6) and satisfies the equation (3), the common mode noise can be most effectively restrained.

According to the first exemplary embodiment, since the bridge circuit includes the fuse 5, the Y capacitors 6 and 7, and the inductor 9, the unbalanced state between the two supply lines 3 and 4 due to the fuse 5 can be improved to reduce the common mode noise generated by the unbalanced state.

EXAMPLE 2

Figure 5A:
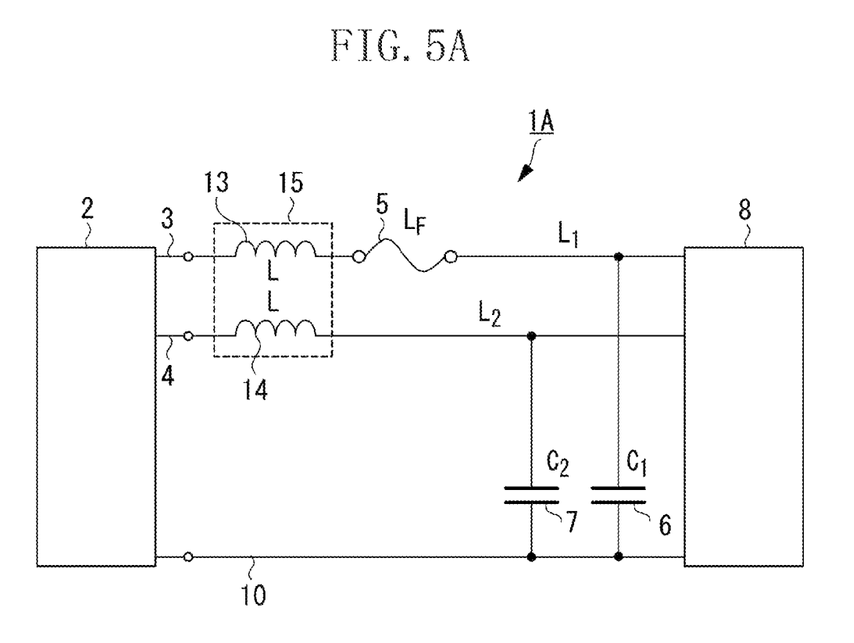
FIG. 5A is a schematic electric circuit diagram of the power source circuit.
Figure 5B:
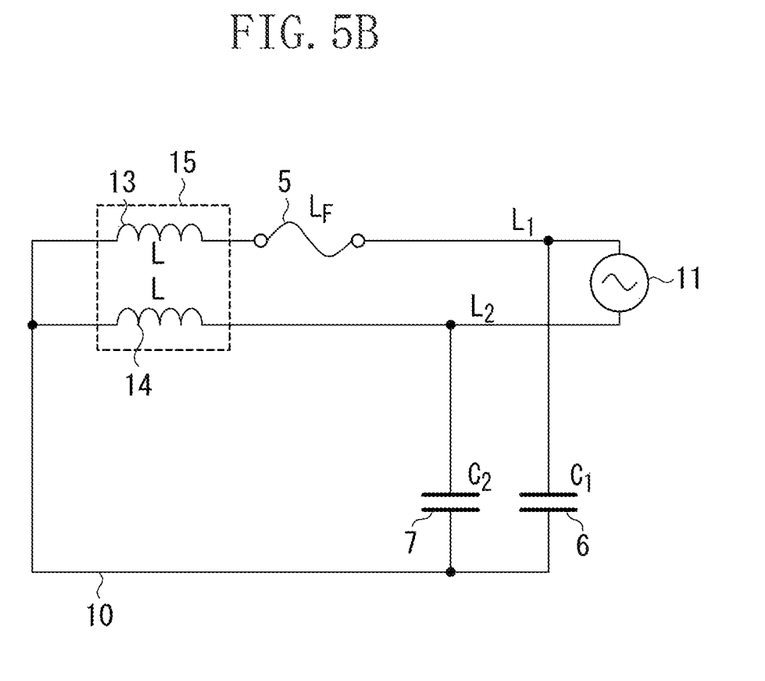
FIG. 5B is an electric circuit diagram in which the power source circuit illustrated in FIG. 5A is replaced with a bridge circuit.

Next the power source circuit according to a second exemplary embodiment of the present invention will be described in detail. FIGS. 5A and 5B illustrate schematic configurations of the power source circuit according to the second exemplary embodiment of the present invention. FIG. 5A is a schematic electric circuit diagram of the power source circuit.

In FIG. 5A, the power source circuit 1A includes the pair of supply lines 3 and 4 connected to the alternating power source 2, a switching circuit 8 as a power conversion circuit for converting the alternating voltage from the alternating power source 2 via the pair of the supply lines 3 and 4 into the direct current voltage. The alternating power source 2 is, for example, the power source in commercial use.

Further, the power source circuit 1A includes the fuse 5 as the excess current protection element provided for, of the pair of supply lines 3 and 4, one supply line 3 having the positive voltage. The fuse 5 is, for example, a tube fuse. The fuse 5 has a higher inductance value than that of the wiring constituting the supply lines 3 and 4.

Furthermore, the power source circuit 1A includes the first line bypass capacitor 6 (hereinafter, referred to as a "first Y capacitor") connected between the ground (GND) 10 and the supply line 3 having the positive voltage.

Moreover, the power source circuit 1A includes the second line bypass capacitor 7 (hereinafter, referred to as a "second Y capacitor") connected between the GND 10 and, of the pair of supply lines 3 and 4, another supply line 4 having the negative voltage.

The power source circuit 1A according to the second exemplary embodiment includes a first normal mode choke coil 13 provided for the supply line 3 having the positive voltage. Furthermore, the power source circuit 1A includes a second normal mode choke coil 14 provided for the supply line 4 having the negative voltage. The above-described two normal mode choke coils 13 and 14 are included in a pair of normal mode choke coils 15.

The normal mode choke coils 13 and 14 are disposed between the alternating power source 2 and the switching circuit 8 and closer to a side of the alternating power source 2 than the Y capacitors 6 and 7. According to the second exemplary embodiment, the inductance value between the first normal mode choke coil 13 and the second normal mode choke coil 14 is set to the same value "L".

FIG. 5B is the electric circuit diagram in which the power source circuit 1A illustrated in FIG. 5A is replaced with the bridge circuit. In FIG. 5B, in place of the switching circuit 8 that is the power conversion circuit, the noise voltage source 11 is connected thereto to simulate the noise generated in the switching circuit 8.

As described above, the power source circuit 1A can be regarded as the bridge circuit of the fuse 5, the Y capacitors 6 and 7, and the normal mode choke coils 13 and 14 including the noise voltage source 11 in place of the switching circuit 8. In FIG. 5B, the noise causing the terminal noise or the electromagnetic wave noise is the current flowing to the GND 10.

Herein, the inductance value of the supply line 3 having the positive voltage and including the inductance component (inductance values "LF" and "L") of the fuse 5 and the first normal mode choke coil 13 is set to L1[H]. Further, the inductance value of the supply line 4 having the negative voltage and including the inductance component (inductance value "L") of the second normal mode choke coil 14 is set to L2 [H]. Furthermore, the capacity value of the first Y capacitor 6 is set to C1[F], the capacity value of the second Y capacitor 7 is set to C2[F]. The expression for reducing the current flowing to the GND 10 is the same as the equation (3) as follows.

$$\frac{C_1}{C_2} = \frac{L_2}{L_1} \qquad (7)$$

According to the second exemplary embodiment, since the supply lines 3 and 4 having the positive voltage and the negative voltage are provided with the normal mode choke coils 13 and 14 respectively, there exists the inductance component of each of normal mode choke coils 13 and 14. Further, since the supply line 3 having the positive voltage is provided with the fuse 5, there also exists the inductance component of the fuse 5.

Therefore, L1≠L2 is acquired, depending on the elements 5, 13, 14 to be used, the inductance values L1 and L2 are determined. Thus, by setting the capacity values C1 and C2 of the Y capacitors 6 and 7 respectively to satisfy the equation (7), the common mode noise can be most effectively restrained.

Figure 6:
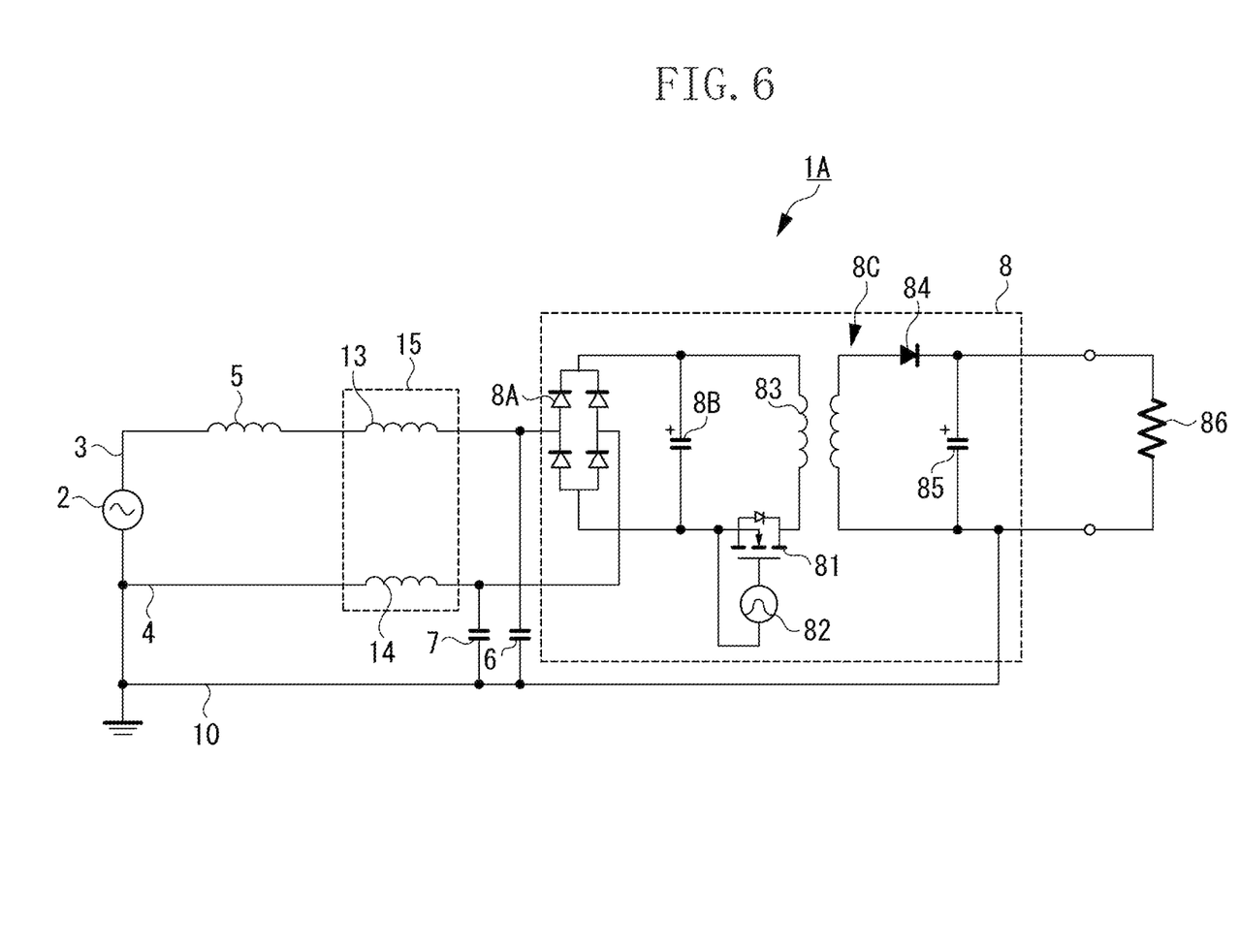
FIG. 6 is an electric circuit diagram illustrating a configuration of a power source circuit according to the second exemplary embodiment of the present invention.

Next, regarding the power source circuit having the specific configuration, effects for reducing the common mode noise will be described. FIG. 6 is the electric circuit diagram illustrating the configuration of the power source circuit.

Any method for the switching operation can be employed for the switching circuit 8. As one example, the flyback method will be described. The switching circuit 8 illustrated in FIG. 6 includes the rectifying circuit 8A including bridge diodes, the smoothing capacitor 8B, and the DC-DC converter circuit 8C.

The rectifying circuit 8A converts the alternating voltage into the direct current voltage. The smoothing capacitor 8B smoothes the direct current voltage converted by the rectifying circuit 8A. The DC-DC converter circuit 8C includes the switching element 81, the switching control circuit 82, the transformer 83, the diode 84, and the capacitor 85.

The switching element 81 includes, for example, the bipolar transistor or the FET, and is turned on/off by the pulse signal output from the switching control circuit 82. When the switching element 81 is on, energy is stored in the transformer 83. When the switching element 81 is off, the energy is supplied to the load 86 via the diode 84.

When the switching element 81 is on, the power is discharged by the capacitor 85 and the energy is supplied to the load 86. With this operation, a direct current voltage of a predetermined value is applied to the load 86.

In the power source circuit 1A of the flyback method, using a circuit simulation, the noise current amount is calculated. As with the above first exemplary embodiment, the alternating voltage of 50 [Hz], 100[V] is input from the alternating power source 2, and the switching signal of the rectangular wave having the frequency 53 [kHz], the rising time 40 [ns], and the duty ratio 25[%] is input to the switching element 81.

Figure 7A:
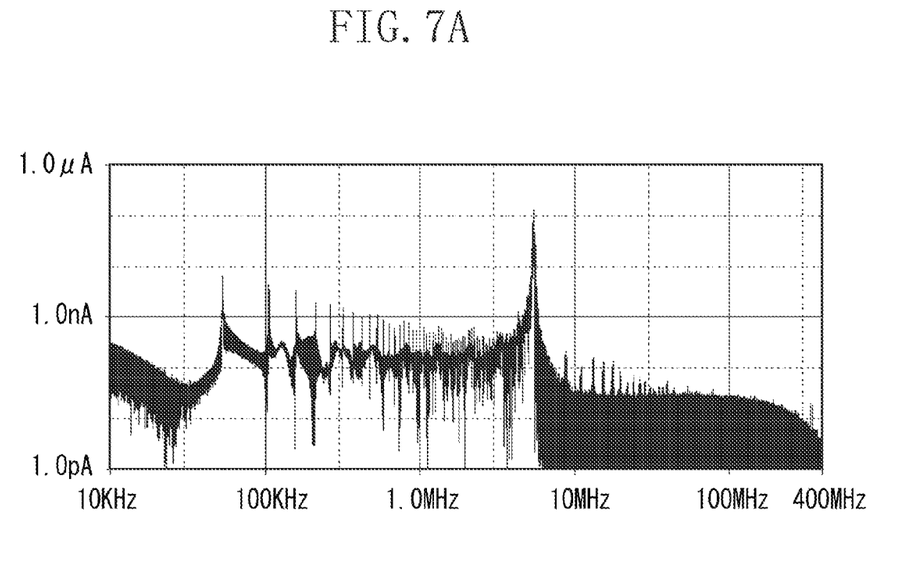
FIG. 7A illustrates an unbalanced state in which a value of a Y capacitor is not adjusted.
Figure 7B:
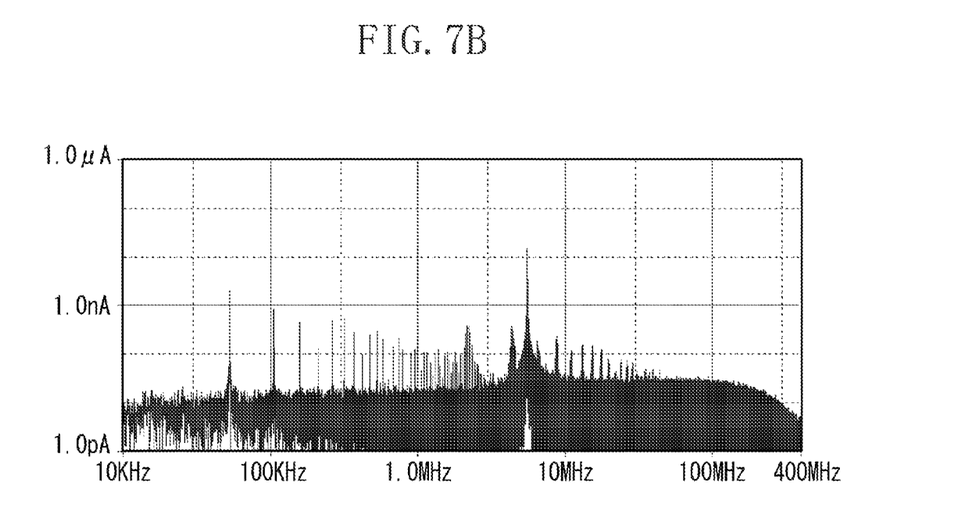
FIG. 7B illustrates a balanced state in which a value of a Y capacitor is adjusted.

FIGS. 7A and 7B illustrate results of current spectra flowing to the GND 10. Each inductance value of the wirings itself of the supply lines 3 and 4 is set to "0". In FIG. 7A, each capacity value of the Y capacitors 6 and 7 connected to the supply lines 3 and 4 having the positive voltage and the negative voltage respectively is set to 1000 [pF], and the inductance value LF of the fuse 5 is set to 20 [nH].

Further, the 7A illustrates the unbalanced state in which each inductance value "L" acquired by converting the normal mode choke coils 13 and 14 into the inductor is set to 0.8 [μH], and the values of the Y capacitors 6 and 7 are not adjusted. In FIG. 7B, the capacity value C1 of the Y capacitor 6 is set to 1000 [pF], and the capacity value C2 of the Y capacitor 7 is set to 1025 [pF] to satisfy the above-described equation (7).

From the results illustrated in FIGS. 7A and 7B, it can be known that, since the capacity values C1 and C2 of the Y capacitors 6 and 7 are adjusted to satisfy the equation (7), the spectrum of the current of the common mode noise generated due to the unbalanced state of the fuse 5 is reduced.

In the description above, the inductance value of the wiring is set to "0", however, the inductance values L1 and L2 may include the inductance value of the wiring.

Next, the range of the capacity values C1 and C2 of the Y capacitors 6 and 7 having the noise reduction effect will be described.

The noise current amount in the power source circuit 1A illustrated in FIG. 5B is calculated using the circuit simulation. The Gaussian pulse of 1[V] is input from the noise voltage source 11. The inductance value LF of the fuse 5 is set to 20 [nH], and each value "L" of the normal mode choke coils 13 and 14 connected to the positive electrode and the negative electrode respectively is set to 0.8 [μH].

In the state described above, FIG. 8 illustrates a graph indicating a ratio of the capacity values C1 and C2 (C1/C2) of the two Y capacitors 6 and 7 on a horizontal axis, and an absolute value of the current of 100 [MHz] flowing to the GND 10 on a vertical axis. From FIG. 8, when the value of the ratio (C1/C2) is equal to the value acquired by the equation (7), which is L2/L1=0.975, the current amount becomes minimum. When the value of C1/C2 is increased from the acquired value, or decreased, the current amount is increased.

Figure 8:
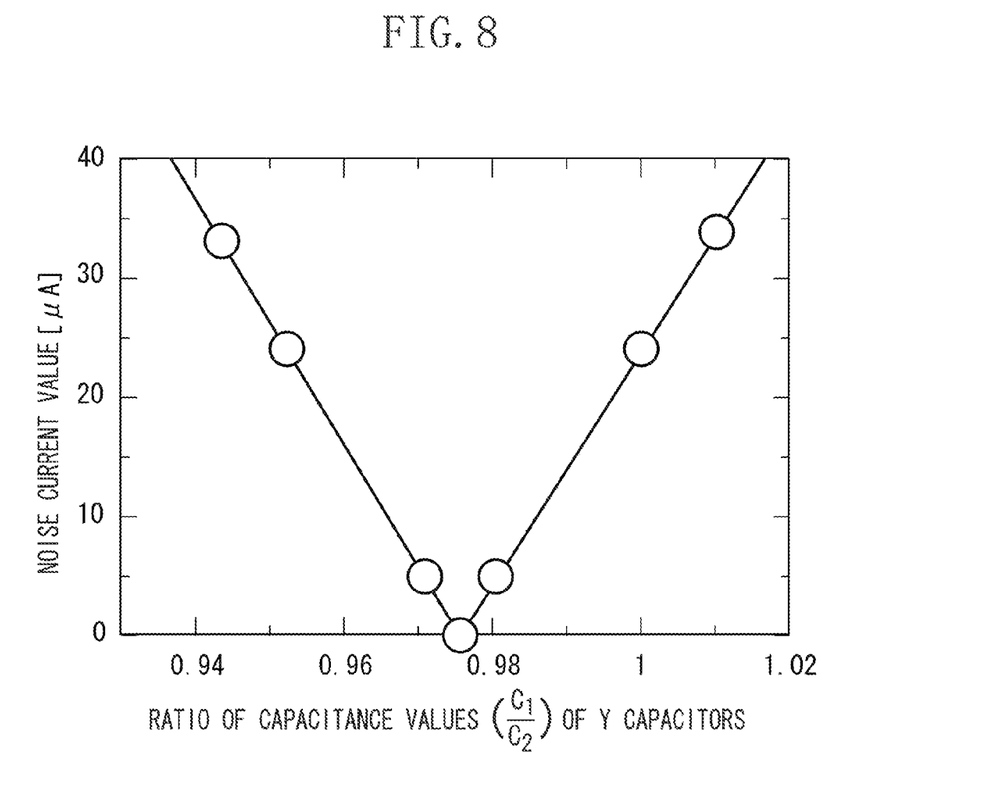
FIG. 8 illustrates a relationship between a ratio of capacity value of Y capacitors, and a current amount of noise in a power source circuit according to the second exemplary embodiment of the present invention.

Further, as illustrated in FIG. 8, the graph is almost symmetry about the minimum current amount, where the values are C1/C2=L1/L2. Thus, the value of C1/C2 for the noise current amount equal to that when C1/C2=1 in which the balance is not considered, which is the Background Art, can be acquired from the equation (8).

$$\frac{2L_2}{L_1} - 1 \quad (8)$$

In other words, when the value of C1/C2 is less than the value acquired by the equation (8), the noise current amount increases more than that when the value of C1/C2 is "1". Thus, the value of C1/C2 when the common mode noise is smaller compared to that when the balance is not conventionally considered is fixed within an area acquired the equation (9).

$$\frac{2L_2}{L_1} - 1 < \frac{C_1}{C_2} < 1 \quad (9)$$

By setting the capacity values C1 and C2 of the first Y capacitor 6 and the second Y capacitor 7 to satisfy the equation (9) as described above, the unbalanced state between the pair of supply lines 3 and 4 due to the fuse 5 can be improved, thereby reducing the common mode noise generated by the unbalanced state.

Further, by setting the capacity values C1 and C2 of the first Y capacitor 6 and the second Y capacitor 7 respectively to satisfy the equation (7) within the equation (9), the common mode noise can be restrained most effectively.

According to the second exemplary embodiment, since the fuse 5, the Y capacitors 6 and 7, the normal mode choke coils 13 and 14 form the bridge circuit, the element does not have to be newly inserted to improve the unbalanced state. Thus, the unbalanced state of the two supply lines 3 and 4 due to the fuse 5 can be easily improved, thereby reducing the common mode noise generated by the unbalanced state.

Based on the above-described exemplary embodiment, the present invention has been described, however, the present invention is not limited thereto. According to the above-described exemplary embodiment, one supply line has the positive voltage and another supply line has the negative voltage. However, the present invention can be applied to a case where one supply line has the negative voltage and another supply line has the positive voltage.

Further, according to the above-described exemplary embodiment, a case has been described where the switching circuit as the power source circuit converts the alternating voltage into the direct current voltage, however, the alternating voltage may be converted into the alternating voltage having the frequency different from that of the input alternating voltage.

In this case, since the power conversion circuit includes an inverter having the switching element to perform the switching operation, the noise is generated therefrom. To this case, the present invention can be also applied.

Further, according to the above-described exemplary embodiment, a case has been described in which the tube fuse is used as the excess current protection element, however, the present invention is not limited thereto, and any type of fuses such as a chip fuse can be used. Furthermore, in addition to the fuse as the excess current protection element, the present invention can be applied to any types of the excess current protection element such as a positive temperature coefficient (PTC) element.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-164000 filed Jul. 21, 2010, which is hereby incorporated by reference herein in its entirety.

The invention claimed is:

1. A power source circuit comprising:
a power conversion circuit configured to convert by a switching operation at least one of a frequency and a voltage of an alternating voltage from an alternating power source via a pair of supply lines;
an excess current protection element provided for one supply line of the pair of supply lines;
a first line bypass capacitor connected between a ground line and the one supply line;
a second line bypass capacitor connected between the ground line and, of the pair of supply lines, another supply line; and
an inductor provided for the another supply line,
wherein, when a capacity value of the first line bypass capacitor is defined as C1[F], a capacity value of the second line bypass capacitor is defined as C2[F], an inductance value of the one supply line including an inductance component of the excess current protection element is defined as L1[H], an inductance value of the another supply line including an inductance component of the inductor is defined as L2[H], and an angular frequency of switching noise is defined as ω [rad/s], the inductance value of the inductor is set to satisfy a following expression $$\frac{2C_1 - C_2 - 2\omega^2 L_1 C_1 (C_1 + C_2)}{3C_2(1 - \omega^2 L_1 (C_1 + C_2))} L_1 <$$

$$L_2 < \frac{2C_1 - C_2 - 2\omega^2 L_1 C_1 (C_1 + C_2)}{C_2(1 - \omega^2 L_1 (C_1 + C_2))} L_1.$$

2. The power source circuit according claim 1, wherein the inductance values of the inductors are set to satisfy a following expression $$\frac{C_1}{C_2} = \frac{L_2}{L_1}.$$

3. A power source circuit comprising:
a power conversion circuit configured to convert by a switching operation at least one of a frequency and a voltage of an alternating voltage from an alternating power source via a pair of supply lines;
an excess current protection element provided for one supply line of the pair of supply lines;
a first choke coil provided for the one supply line;
a second choke coil provided for another supply line of the pair of supply lines;
a first line bypass capacitor connected between a ground line and the one supply line; and
a second line bypass capacitor connected between the ground line and another supply line,
wherein, when an inductance value of the one supply line including an inductance component of the first choke coil and the excess current protection element is defined as L1[H], an inductance value of the another supply line including an inductance component of the second choke coil is defined as L2[H], a capacity value of the first line bypass capacitor is defined as C1[F], a capacity value of the second line bypass capacitor is defined as C2[F], the capacity values of the first line bypass capacitor and the second line bypass capacitor are set to satisfy a following expression $$\frac{2L_2}{L_1} - 1 < \frac{C_1}{C_2} < 1.$$

4. The power source circuit according claim 3, wherein the inductance values of the inductors are set to satisfy a following expression $$\frac{C_1}{C_2} = \frac{L_2}{L_1}.$$

* * * * *